(12) United States Patent
Danen et al.

(10) Patent No.: US 10,615,067 B2
(45) Date of Patent: Apr. 7, 2020

(54) PHASE FILTER FOR ENHANCED DEFECT DETECTION IN MULTILAYER STRUCTURE

(71) Applicant: KLA-Tencor Corporation, Milpitas, CA (US)

(72) Inventors: Robert M. Danen, Pleasanton, CA (US); Dmitri G. Starodub, Santa Clara, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 16/100,818

(22) Filed: Aug. 10, 2018

(65) Prior Publication Data
US 2019/0355601 A1   Nov. 21, 2019

Related U.S. Application Data

(60) Provisional application No. 62/673,518, filed on May 18, 2018.

(51) Int. Cl.
*H01L 21/67* (2006.01)
*H01L 21/66* (2006.01)
(Continued)

(52) U.S. Cl.
CPC ... *H01L 21/67288* (2013.01); *G01N 21/8806* (2013.01); *G01N 21/95* (2013.01);
(Continued)

(58) Field of Classification Search
CPC ............ G01N 21/95; G01N 21/8806; G01N 2201/0675; H01L 22/12; H01L 21/67288;
(Continued)

(56) References Cited

U.S. PATENT DOCUMENTS 5,642,183 A * 6/1997 Sugihara ............. G03F 7/70091
355/71
9,075,027 B2 7/2015 Lange
(Continued)

OTHER PUBLICATIONS

PCT International Search Report PCT/US2019/030777, International Filing Date May 6, 2019. dated Aug. 22, 2019. 3 pages.
(Continued)

*Primary Examiner* — Sang H Nguyen
(74) *Attorney, Agent, or Firm* — Kwan & Olynick LLP

(57) ABSTRACT

Disclosed are methods and apparatus for facilitating defect detection in a multilayer stack. The method includes selection of a set of structure parameters for modeling a particular multilayer stack and a particular defect contained within such particular multilayer stack and a set of operating parameters for an optical inspection system. Based on the set of structure and operating parameters, an electromagnetic simulation is performed of waves scattered from the particular multilayer stack and defect and arriving at a collection pupil of the optical inspection system. Based on the simulated waves at the collection pupil, a design of a phase filter having a plurality of positions for changing a plurality of phases within a plurality of corresponding positions of the collection pupil of the optical inspection tool is determined so as to compensate for an adverse effect of the particular multilayer stack on obtaining a defect signal for the defect within such particular multilayer stack and/or to enhance such defect signal. The design of the phase filter is then provided for fabrication or configuration of a phase filter inserted within the optical inspection system for detection of defects in multilayer stacks with the same structure parameters as the particular multilayer stack. Methods and systems for inspecting a multilayer stack for defects are also disclosed.

11 Claims, 12 Drawing Sheets

(51) Int. Cl.
   *G01N 21/88* (2006.01)
   *G01N 21/95* (2006.01)
   *G02B 27/00* (2006.01)
   *G06F 17/50* (2006.01)
   *H01L 27/11556* (2017.01)
   *H01L 27/11582* (2017.01)
   *H01L 21/02* (2006.01)

(52) U.S. Cl.
   CPC ..... *G02B 27/0012* (2013.01); *G06F 17/5018* (2013.01); *H01L 22/12* (2013.01); *G01N 2201/0675* (2013.01); *G06F 2217/16* (2013.01); *H01L 21/02532* (2013.01); *H01L 21/02636* (2013.01); *H01L 27/11556* (2013.01); *H01L 27/11582* (2013.01)

(58) Field of Classification Search
   CPC ......... H01L 21/02636; H01L 21/02532; H01L 27/11556; H01L 27/11582; G02B 27/0012; G06F 17/5018; G06F 2217/16
   See application file for complete search history.

(56) References Cited

U.S. PATENT DOCUMENTS

| | | | |
|---|---|---|---|
| 9,217,715 B2 * | 12/2015 | Ahner | G01N 21/4738 |
| 9,389,349 B2 | 7/2016 | Kolchin et al. | |
| 9,612,209 B2 | 4/2017 | Lange | |
| 9,696,264 B2 | 7/2017 | Lange et al. | |
| 9,989,479 B1 | 6/2018 | Kolchin et al. | |
| 2012/0113416 A1 * | 5/2012 | Lange | G01N 21/95607 356/237.5 |
| 2014/0016125 A1 * | 1/2014 | Sullivan | G01N 21/9501 356/237.5 |
| 2014/0218723 A1 | 8/2014 | Ishimaru et al. | |
| 2014/0268117 A1 | 9/2014 | Kolchin et al. | |
| 2014/0300890 A1 * | 10/2014 | Lange | G01N 21/9501 356/51 |
| 2014/0307052 A1 | 10/2014 | Ahn et al. | |
| 2014/0354982 A1 * | 12/2014 | Ahner | G01N 21/4738 356/237.3 |
| 2015/0226539 A1 * | 8/2015 | Roeth | G01B 11/005 356/614 |
| 2015/0285836 A1 * | 10/2015 | Humphris | G01Q 10/045 850/1 |
| 2017/0148226 A1 | 5/2017 | Zhang et al. | |
| 2018/0100814 A1 * | 4/2018 | Zhang | G01N 21/95607 |
| 2018/0103247 A1 | 4/2018 | Kolchin et al. | |

OTHER PUBLICATIONS

Written Opinion PCT/US2019/030777, International Filing Date May 6, 2019. dated Aug. 22, 2019. 4 pages.

* cited by examiner

PHASE FILTER FOR ENHANCED DEFECT DETECTION IN MULTILAYER STRUCTURE

CROSS-REFERENCE TO RELATED APPLICATION

This application claims priority to U.S. Provisional Patent Application No. 62/673,518, filed 18 May 2018, entitled Broadband Plasma (BBP) Phase Filter for 3D NAND Inspection, by Robert Danen et al., which application is incorporated herein by reference in its entirety for all purposes.

TECHNICAL FIELD OF THE INVENTION

The invention generally relates to the field of wafer and reticle inspection systems. More particularly, the present invention relates to inspection and review of multi-layer device structures, such as memory and logic devices, and other structures.

BACKGROUND

As demand for ever-shrinking semiconductor devices continues to increase, it has become particularly difficult to continue shrinking semiconductor devices, due to rapidly increasing costs associated with lithography and multiple process steps associated with pitch splitting techniques.

As device structures continue to decrease in size and become more complex, some of these structures may present challenges for detection of defects. For instance, a defect that is buried in a multilayer structure may be difficult to detect or characterize without destroying the device. Thus, there is a need for semiconductor wafer inspection systems for reliably and nondestructively detecting defects in multiple layer semiconductor devices, such as 3D NAND and DRAM memory and logic, as well as other complex structures that present defect detection challenges.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, a method of facilitating defect detection in a multilayer stack is disclosed. The method includes selection of a set of structure parameters for modeling a particular multilayer stack and a particular defect contained within such particular multilayer stack and a set of operating parameters for an optical inspection system. Based on the set of structure and operating parameters, an electromagnetic simulation is performed of waves scattered from the particular multilayer stack and defect and arriving at a collection pupil of the optical inspection system. Based on the simulated waves at the collection pupil, a design of a phase filter having a plurality of positions for changing a plurality of phases at a plurality of corresponding positions within the collection pupil of the optical inspection tool is determined so as to compensate for an adverse effect of the particular multilayer stack on obtaining a defect signal for the defect within such particular multilayer stack and/or to enhance such defect signal. The design of the phase filter is then provided for fabrication or configuration of a phase filter inserted within the optical inspection system for detection of defects in multilayer stacks with the same structure parameters as the particular multilayer stack.

In a specific implementation, the electromagnetic simulation is performed using a Rigorous Couple Wave Analysis (RCWA) technique, a Finite Difference Time Domain (FDTD) technique, or a Finite Element Method (FEM) technique. In one aspect, the particular multilayer stack is a 3D NAND, FinFET, or DRAM structure on a semiconductor wafer.

In one embodiment, the structure parameters include one or more of the following multilayer stack parameters for each layer: thickness, shape, patterns, refractive index, line edge roughness (LER), or relative placement with respect to other layers; the structure parameters include one or more of the following defect parameters: defect position with respect to the multilayer stack, defect type, defect composition, defect size, or defect shape; and the operating parameters include one or more of the following parameters: one or more illumination polarizations, one or more scattered waves polarizations, one or more spectral bands, one or more incident angles, one or more collection angles, one or more optical attenuation filters, one or more focus settings, or one or more light exposure settings.

In a specific aspect, performing the electromagnetic simulation of waves scattered from the particular multilayer stack and defect comprises simulating a plurality of phase values at the collection pupil, via simulation of a scattering matrix, for the particular multilayer stack being both present and absent, and the design of the phase filter is based on a difference between the simulated phase values for the particular multilayer stack being present and the simulated phase values for the particular multilayer stack being absent. In a further aspect, simulating the phase values includes averaging simulated phase values across a plurality of different incident angles, different collection angles, and different combinations of illumination polarizations and collection polarizations. In another aspect, simulating the phase values includes weighted averages of simulated phase values across a plurality of different incident angles, different collection angles, and different combinations of illumination polarizations and collection polarizations. In another aspect, determining a design of the phase filter further comprises interpolating the phase values on a finer grid than the grid used for simulating such phase values. In yet another aspect, determining a design of the phase filter further comprises combining such design with a focus shifting filter so as to minimize large changes in phase values across such phase filter.

In an alternative embodiment, performing an electromagnetic simulation of waves scattered from the particular multilayer stack and defect comprises performing an optimization process for applying a simulated phase filter, which has a plurality of positions for changing phase values, at the collection pupil to simulated scattered waves in order to find an optimized simulated phase filter, and the design of the phase filter is based on the optimized simulated phase filter. In one aspect, the optimization process includes maximizing a difference between a simulated image, at an image plane, of the particular multilayer stack with and without the particular defect. The difference in signal from a defect of interest (DOI) and a nuisance defect may also be maximized so as to filter out nuisance defects from the analysis. In one example, the simulated image is based on summation of field intensities in the image plane over a plurality of incident angles and a plurality of polarizations. In another example, the optimization process includes minimizing a measurement of deviation from an optimum system response in three dimensions, constrained by a wave propagation equation.

In another embodiment, the invention pertains to a method of inspecting a multilayer stack in an optical inspection tool. In this embodiment, a phase filter is provided in the inspection tool, and the phase filter has a plurality of positions for changing a plurality of phases at a plurality of positions within a collection pupil of the inspection tool. The phase filter was designed to compensate for an adverse effect of a particular multilayer stack on obtaining a defect signal for a defect, if any, within such particular multilayer stack and/or to enhance such defect signal. An image is generated based on light scattered from the particular multilayer stack in response to an incident beam directed towards such particular multilayer stack, and it is determined whether the particular multilayer stack has a defect based on the image. The phase filter may be designed using any of the above described methods. The method may also include determining a depth of such defect, if present, based on the image or a plurality of images generated at a plurality of depths of the particular multilayer stack.

In another embodiment, the invention pertains to an inspection system for detecting defects in a multilayer stack. The system includes a light source for generating an illumination beam and an illumination lens system for directing the illumination beam towards a multilayer stack. The system also includes a collection lens system for directing towards a detector scattered light from a multilayer stack in response to the illumination beam, and the collection lens system includes a phase filter having a plurality of positions for changing a plurality of phases at a plurality of positions of a collection pupil of the system. The phase filter is designed to compensate for an adverse effect of a particular multilayer stack on obtaining a defect signal for a defect, if any, within such particular multilayer stack and/or to enhance such defect signal, and may be designed using any of the above described methods. The system also includes a controller for generating an image based on light scattered from the particular multilayer stack in response to an incident beam directed towards the particular multilayer stack and determining whether the particular multilayer stack has a defect based on the image. The phase filter may have a fixed design or take the form of an adjustable phase/amplitude spatial light modulator, such as from liquid crystal on silicon.

These and other aspects of the invention are described further below with reference to the figures.

DETAILED DESCRIPTION OF EXAMPLE EMBODIMENTS

In the following description, numerous specific details are set forth in order to provide a thorough understanding of the present invention. The present invention may be practiced without some or all of these specific details. In other instances, well known component or process operations have not been described in detail to not unnecessarily obscure the present invention. While the invention will be described in conjunction with the specific embodiments, it will be understood that it is not intended to limit the invention to the embodiments.

Although inspection systems and techniques are described herein as being applied to certain types of vertical NAND (3D NAND) memory structures, it is understood that embodiments of the present invention may be applied to any suitable structure that complicates retrieval of signals obtained from a defect that is located within or on top of such structure. Example stack structures include 3D or vertical semiconductor structures, such as NAND, NOR, or DRAM memory or other logic devices formed using terabit cell array transistors (TCAT), vertical-stacked array transistors (VSAT), bit cost scalable technology (BiCST), piped shaped BiCS technology (P-BiCS), fin field-effect (FinFET) transistors, gate-all-around (GAA) FET, etc. The vertical direction is generally a direction that is perpendicular to the substrate surface. Additionally, although particular fabrication steps, processes, and materials are described for forming such stack structures, inspection embodiments may be applied at any point in the fabrication flow that results in multiple layers being formed on a substrate, and such layers may include any number and type of materials.

General fabrication techniques for forming vertical structures, such as 3D NAND, will be described prior to describing various systems and techniques for facilitating inspection for defect detection in such structures. Specific fabrication details and material types and characteristics are omitted for clarity purposes.

Figure 1A:
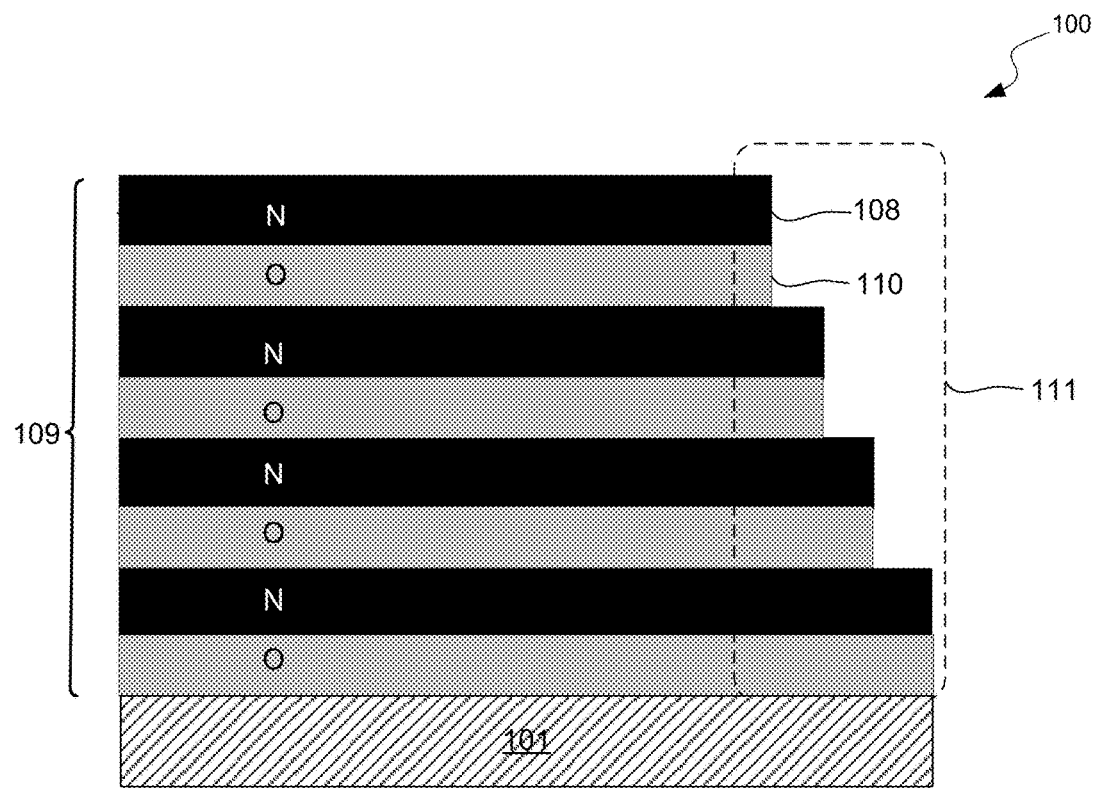
FIGS. 1A-C illustrates a process for fabricating a "gate last" type of 3D NAND memory devices.
Figure 1B:
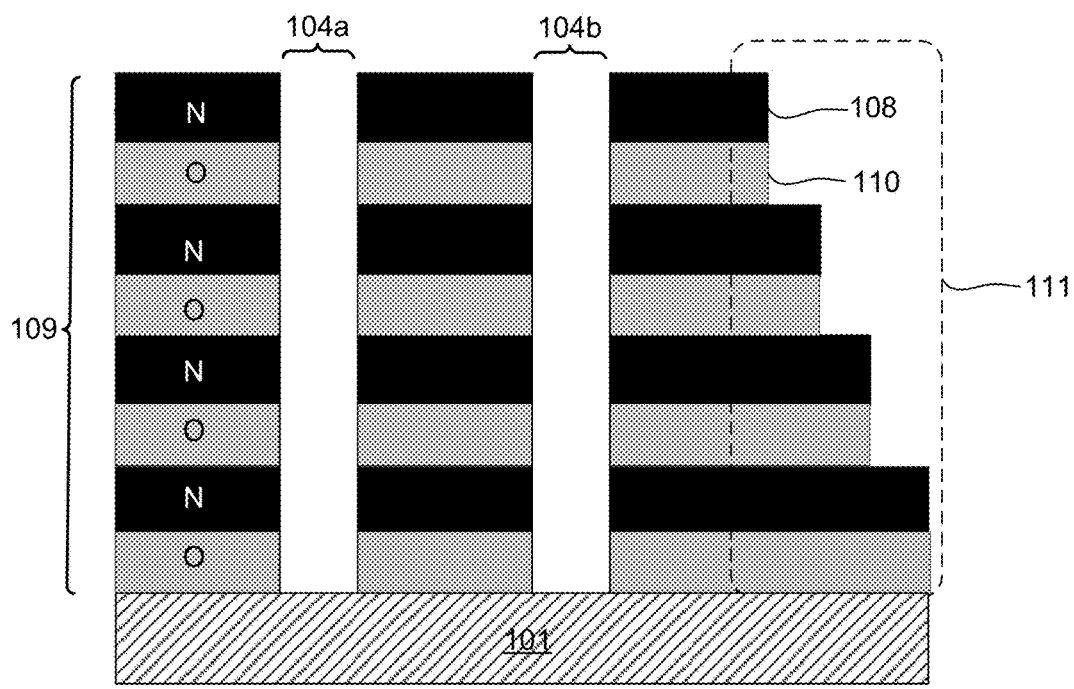
Figure 1C:
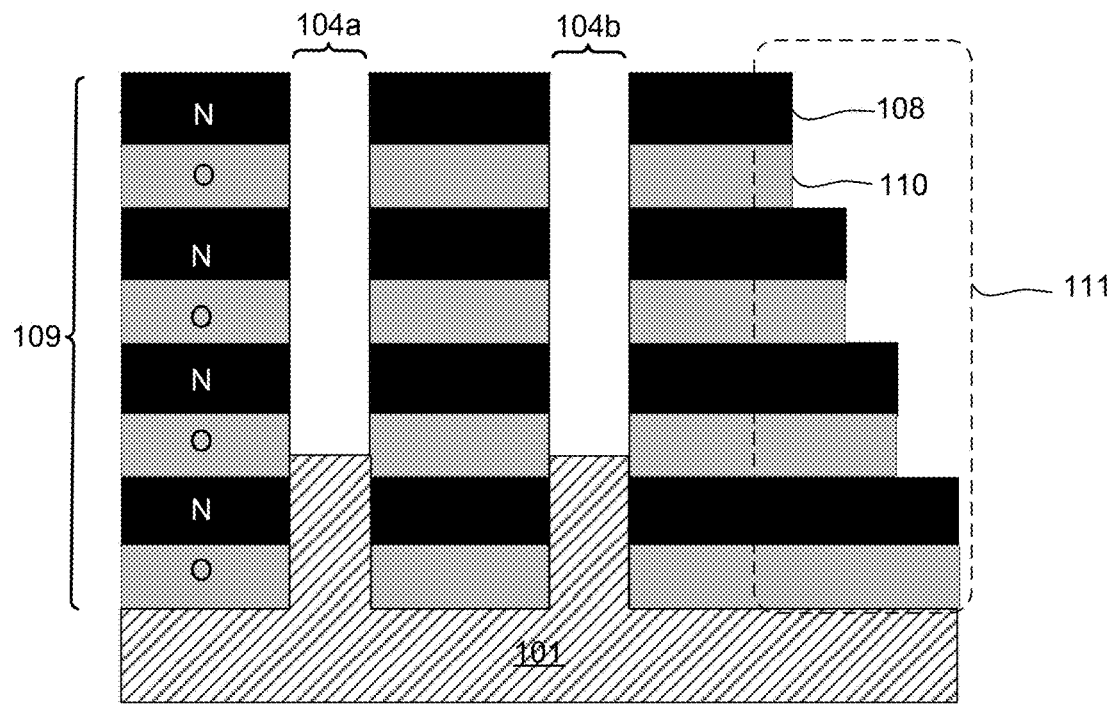

FIGS. 1A-C illustrate some of the processes for fabricating a "gate last" type of 3D NAND memory device. This gate last architecture may generally include alternating layers of oxide (O) and SiN or nitride (N) materials, which are collectively referred to as an oxide-nitride-oxide-nitrite (ONON) structure. Other types of 3D NAND structures may take the form of a gate-first 3D NAND structure that is formed by depositing alternating oxide (O) and poly silicon (Poly Si) layers, which may then be patterned in a similar manner as the ONON structure as described below.

FIG. 1A is a diagrammatic side view of the patterned ONON layers 109 of a gate-last 3D NAND memory portion 100. As shown, alternating layers of an oxide (O) and nitride (N) material are deposited on a substrate 101, such as silicon. For instance, the ONON layers 109 include oxide (O) layer portion 110 and nitride (N) layer portion 108. The ONON layers 109 may be formed using any suitable deposition and etching process. In one example, multiple pairs of a SiO (O) and SiN (N) layers are deposited and etched within the memory array area. The device may include more than 30 pairs of ON layers, including dummy layers, although not all the layers are shown in FIG. 1A so as to simplify the description. Any suitable fabrication process may be used to deposit and etch the ONON layers within the device area, such as chemical vapor deposition (CVD) for depositing the layers and one or more etching processes, such as a hydrofluoric (HF) acid and/or a hot phosphoric acid etch, for etching the ONON layers to be formed within the memory area.

After multilayer deposition of the ONON layers 109, a staircase pattern 111 is typically formed at one end of the ONON layers 109. This staircase pattern 111 may be formed by initially depositing a thick photoresist layer that is patterned and used for etching the bottom pair of ON layers. A portion of the photoresist layer still remains after the first etching, and this photoresist layer is then trimmed and used to etch the $2^{nd}$ and $1^{st}$ pairs of ON layers, and these trimming and etching processes are repeated for subsequent ON pairs to form the staircase pattern 111.

After the ONON layers 109 are formed, channels may then be formed as shown in FIG. 1B. As shown, channels 104a and 104b are formed in ONON layers 109. Although not shown, these channels are typically formed in more layers (>30 pairs). Accordingly, each channel is very deep (e.g., greater than 3 µm). Additionally, each channel can have an aspect ratio that is greater than 30:1. The channel etch process has several challenges. For instance, the etch needs to result in straight holes with uniform circumferences that go through all the ONON layers to the silicon substrate and result in tightly controlled top and bottom critical dimensions (CD).

A selective epitaxial growth (SEG) process may then be applied to the silicon at the bottom of the channels as shown in FIG. 1C. Typically, the SEG silicon is grown at the bottom of each channel until it reaches the $2^{nd}$ oxide layer, which tends to be thicker than the other oxide layers (not shown). The SEG silicon layer at the bottom of each channel has a thickness that is also tightly controlled, as well as inhibiting contaminants from interfering with the SEG process.

These processes for forming a 3D NAND device may have a number of challenges, for example, as described above. In general, 3D NAND memory devices tend to have thicker stacks of materials and structures, as compared with planar memory devices. For instance, early 3D NAND devices have at least 2-3 µm thick stacks, and future stacks are predicted to be in the 6-8 µm range or more. Some stacks can easily include 60 to 90 layers at varying thicknesses. In comparison, a typical planar memory thickness is about 0.1 to 1 µm (less than or equal to 1 µm), depending upon the process step.

Figure 1D:
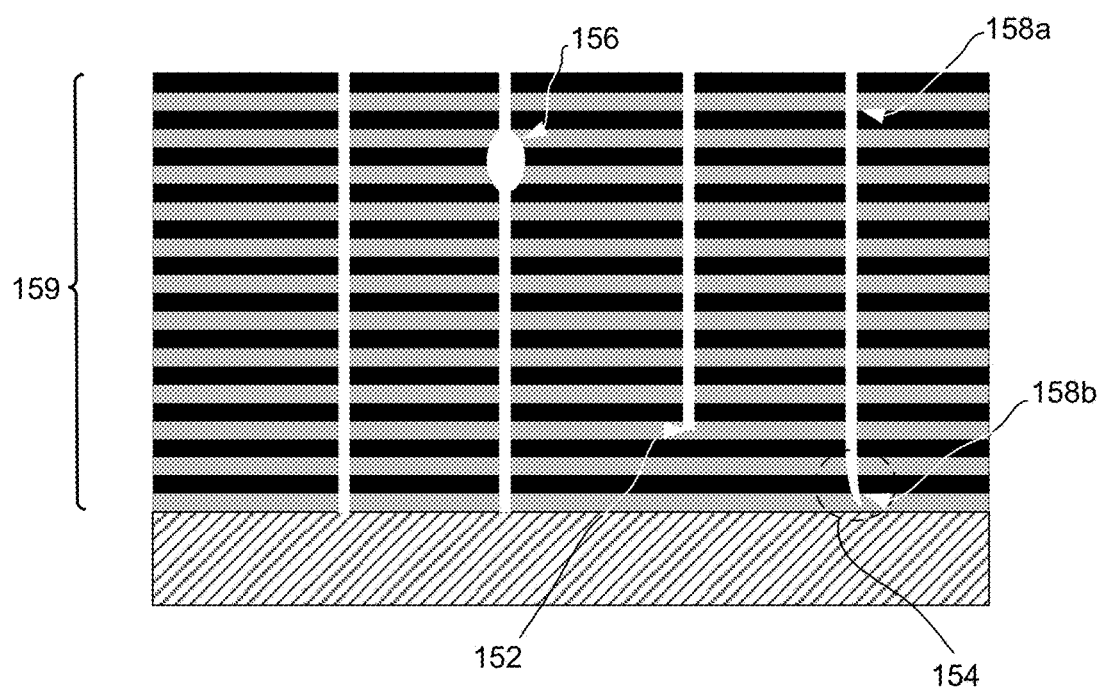
FIG. 1D illustrates a 3D NAND structure portion with various defects.

Defects can occur in the partially formed 3D NAND and need to be detected to ensure high manufacturing yields. FIG. 1D illustrates a 3D NAND structure portion with various defects. As shown, the multilayer structure 159 contains various channel defects, including channel under-etch defect 152, a twisting channel defect 154, a bowing defect 156, and a CD variation defect between the top CD 158a and the bottom CD 158b of the twisted channel. Another defect may take the form of SEG overgrowth within a channel (not shown).

Regardless of the particular type of fabrication process, defects are often difficult to detect when buried in a multiple layer stack. For instance, defects in 3D NAND wafers are usually buried under a thick stack (greater than or equal to 3 um) of thin alternating materials as described above by way of example. The stack usually contains structures, such as arrays of holes, pillars with varying materials, or trenches. The stack often modifies the optical image of a buried defect, for example, by splitting it into several weaker spots in a single plane image, and by elongating the scattered intensity into complicated shapes in three-dimensional (3D) through-focus images (e.g., taken at different focus depths). The consequence of this effect is a significantly reduced sensitivity and an increased nuisance rate for optical inspections. These effects also may result in failure to determine the depth of a defect's location in 3D through focus optical images.

Certain embodiments of the present invention provide apparatus and techniques to compensate for the degrading effect of 3D NAND stacks (or the like) and enhance the defect signal by designing and utilizing a patterned phase filter inserted in the collection pupil of the optical imaging system. In certain embodiments, a specifically designed phase filter is placed in the collection pupil plane to increase the defect signal and simplify the image point spread function. In the case of a 3D NAND structure, this phase filter may be designed or configured to compensate for the adverse effect of the patterned stack on the inspection defect image. A phase filter may generally be used to enhance the defect signal. Phase filter may be used to compensate for other types of stacks (and enhance the defect signal) are also contemplated.

Filter design may be based on the results of electromagnetic simulation, such as Rigorous Couple Wave Analysis (RCWA), of the waves scattered from a defect inside a 3D stack geometry. RCWA is a Fourier-space method in which devices and fields are represented as a sum of spatial harmonics. Besides RCWA, other simulation techniques may be used, such as Finite-Difference Time-Domain (FDTD), finite element method (FEM), etc. Suitable FDTD simulators are available from Panoramic Technology Inc. of San Francisco, Calif. and as open source MEEP software that is maintained by Simpetus of San Francisco, Calif.

Figure 2:
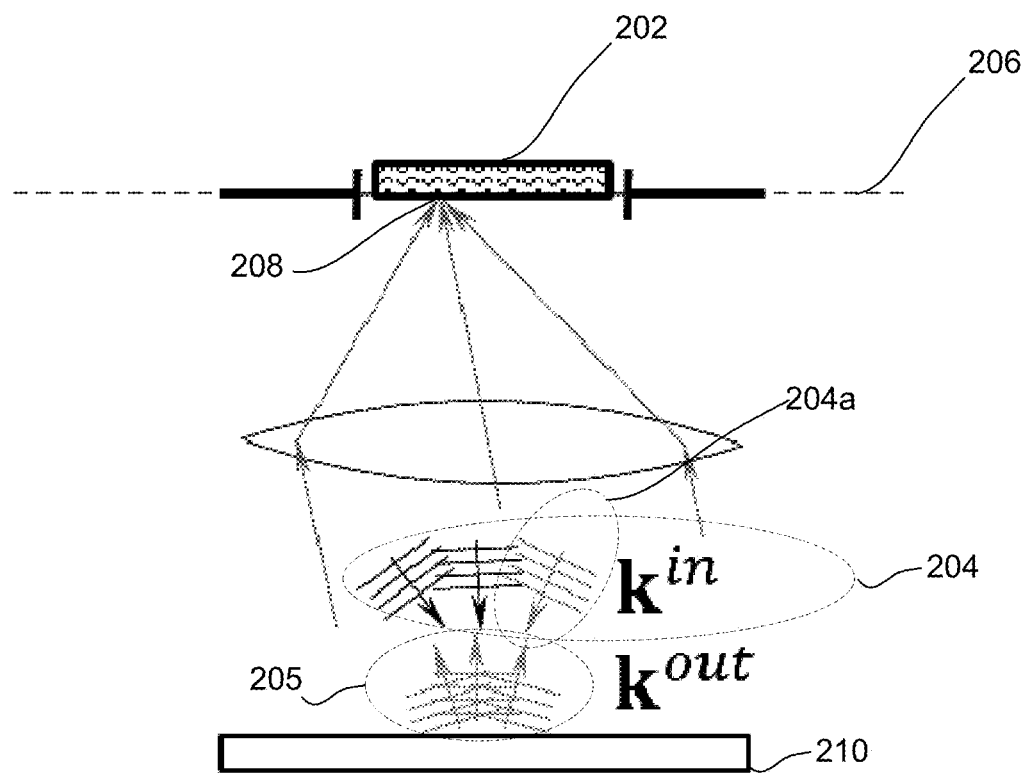
FIG. 2 illustrates simulation of incident and scattered wave fields for determining phase values of an exit pupil in accordance with one example implementation of the present invention.

An electromagnetic simulation process may be set up to provide phase values of the exit wave field (or wave front) for different illumination directions, wavelengths, polarizations, etc. FIG. 2 illustrates simulation of incident and scattered wave fields for determining phase values of an exit pupil 206 in accordance with one example implementation of the present invention. In one simulation technique, the incident wave may be decomposed into a set of plane waves 204 that are incident at different illumination directions onto the simulated target 210. The coherent scattering of each plane wave on the structure (with and without defect) on the simulated target 210 may then be computed. As shown, the incident wave 204a and resulting scattered waves 205 are shown as a light gray color in FIG. 2. Simulated exit phase values at each pupil position (e.g., 208) can be computed and then "real" phase values can be manipulated on the inspection tool by use of a carefully designed phase filter 202 placed in the collection pupil plane 206. In effect, the designed phase filter 202 provides a constructive interference with the scattered waves from the defect (and/or destructive interference with scattered waves from the stack) so as to maximize/enhance the defect signal in the image plane.

Figure 3A:
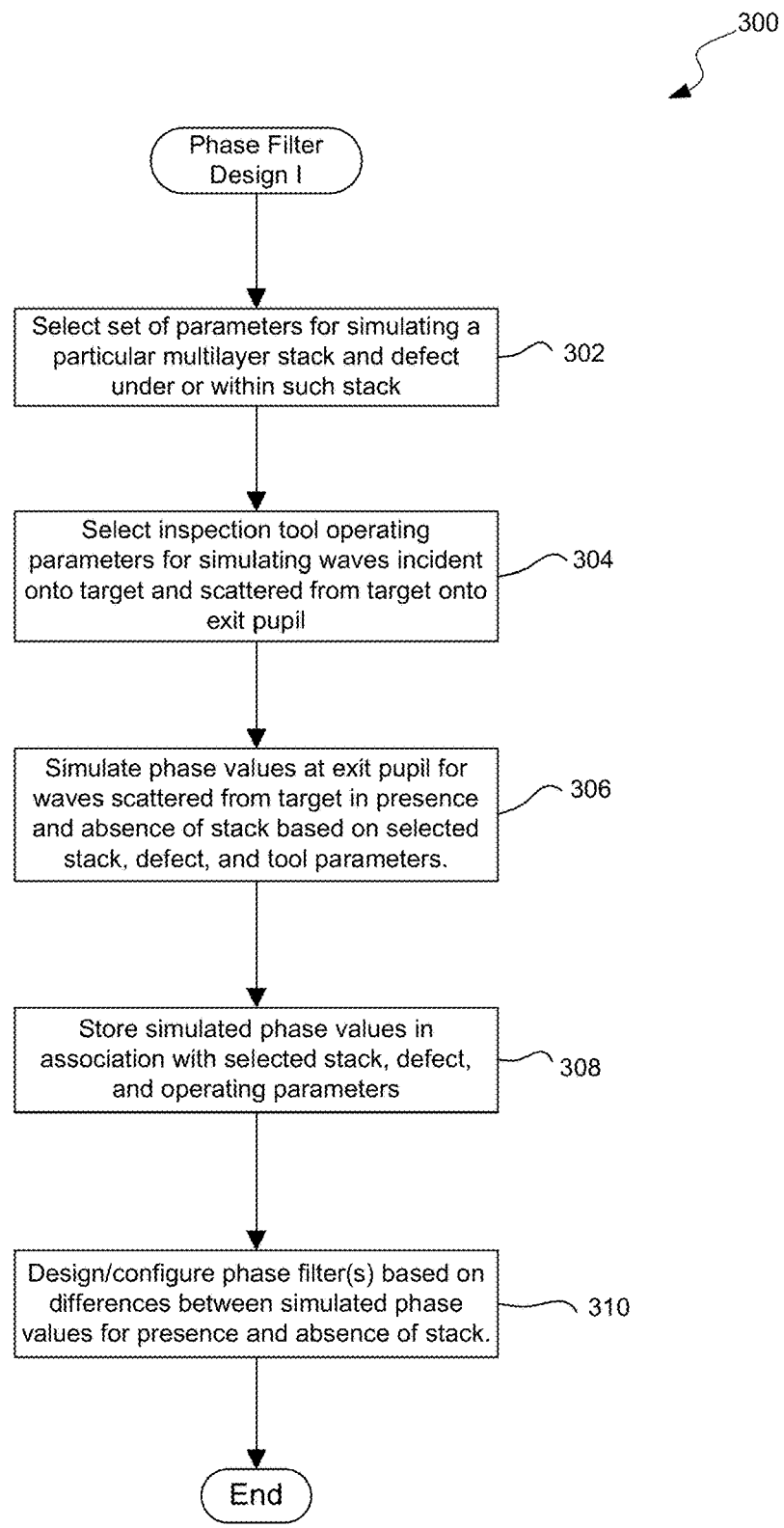
FIG. 3A is a flow chart illustrating a process for designing a phase filter for optimization of defect signals that are detected in the presence of a stack structure in accordance with a first embodiment of the present invention.

FIG. 3A is a flow chart illustrating a process 300 for designing a phase filter for optimization of defect signals that are detected in the presence of a stack structure in accordance with a first embodiment of the present invention. Initially, a set of parameters for simulating a particular multilayer stack and defect under or within such stack are selected in operation 302. That is, modelled structure parameters for the stack and defect may be selected for input into the simulation process.

The techniques and apparatus that are presented herein may be practiced on any suitable type of multilayer stack and defect. The stack may include any number and type of layers with any number and type of structures patterned in such layers, such as pillars, holes, or trenches that are filled with various materials, as well as lines, gratings, or other structures. Accordingly, structure parameters may include any combination of the following stack parameters for each layer feature: thickness, shape, patterns, refractive index, line edge roughness (LER), relative placement with respect to other layer features, etc. The structure parameters may include any combination of the following defect parameters: position with respect to the stack (vertical, as well as within X and Y positions), type, composition, size, or shape. In sum, different sets of simulation parameters may be used for different device or wafer structures and different defects, as well as different fabrication processes.

Figure 4A:
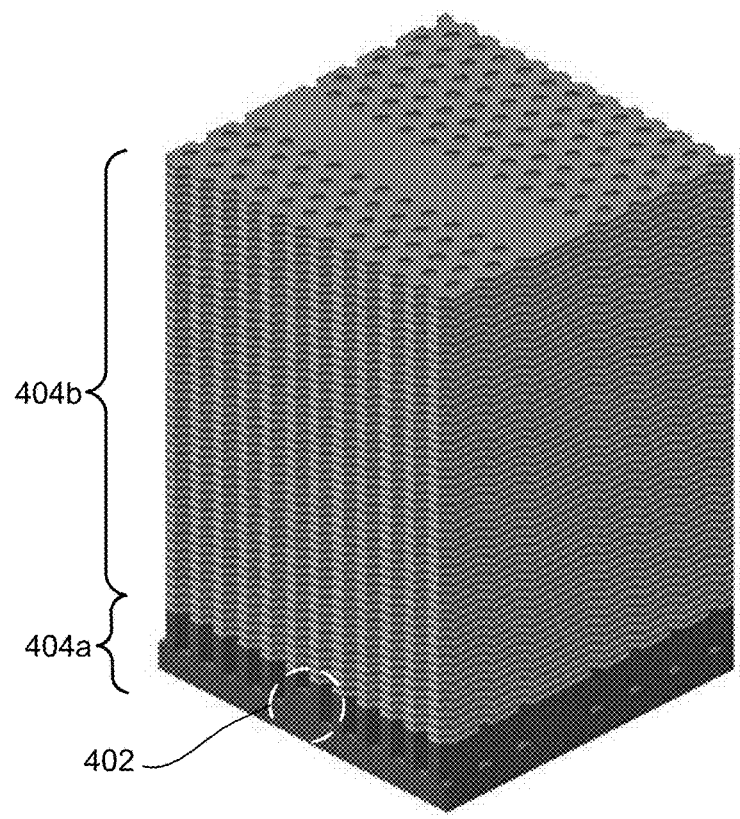
FIG. 4A shows a representative 3D NAND structure at the channel hole etch step.
Figure 4B:
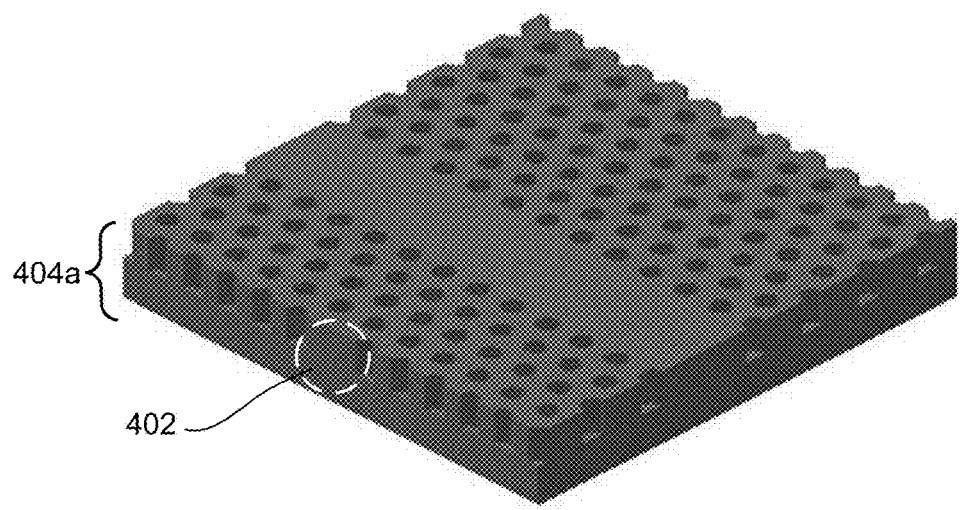
FIG. 4B illustrates the 3D NAND structure of FIG. 4A with the multilayer stack above the defect being removed.

A representative 3D NAND structure at the channel hole etch fabrication step with a defect in area 402 is depicted in FIG. 4A. As shown, an upper portion of the multilayer stack 404b is above the defect area 402, which is positioned within lower stack area 404a. For instance, the defect is an under-etch defect in Poly buried under a 2.5 μm ONON film stack, patterned with hexagonal hole arrays separated by blank regions. FIG. 4B depicts the 3D NAND structure without the upper stack portion (404b from FIG. 4A). That is, the upper stack portion (e.g., the 2.5 μm ONON film stack) that is above the defect area 402 is removed while retaining the lower stack portion 404a in FIG. 4B. The simulation parameters for the structures of FIGS. 4A and 4B may be provided for simulating waves that are incident on and scattered from such structures.

The inspection tool operating parameters for simulating waves that are incident on the target and scattered from such target onto the exit pupil may also be provided in operation 304. For instance, the operating parameters may include various inspection tool configurations/settings for the illumination and collection optics, such as illumination polarization, scattered waves polarization, spectral band, incident angle or numerical aperture (NA), focus, light exposure, attenuation within entrance or exit pupils, etc. In a specific implementation, simulation phase results are obtained for broadband plasma illumination and the following polarization settings: horizontal polarization for illumination and horizontal polarization for scattered waves, horizontal polarization for illumination and vertical polarization for scattered waves, vertical polarization for illumination and horizontal polarization for scattered waves, and vertical polarization for illumination and vertical polarization for scattered waves.

Phase values at the exit/collection pupil may then be simulated for waves scattered from the target in both the presence and absence of stack based on the selected stack, defect, and tool parameters in operation 306. The simulated phase values may then be stored in association with the selected stack, defect, and operating parameters in operation 308.

Next one or more phase filter(s) may be designed or configured based on the difference between simulated phase values for presence and absence of stack in operation 310, and the process ends. The phase filter design may be based on a portion or all of the selected parameters. Additionally, the filter design process may be repeated for different structures, defects, and/or operating parameters. For instance, simulations may be performed for different incident angles, incident polarizations, scattered polarizations, wavelengths, stack configurations, defect types, defect positions, etc. Separate phase filters may be designed for different sets of operating parameters of the tool during inspection and different targets. A same phase filter may also be designed based on a combination of simulation results from different operating parameters (e.g., polarization, incident angles).

Figure 5A:
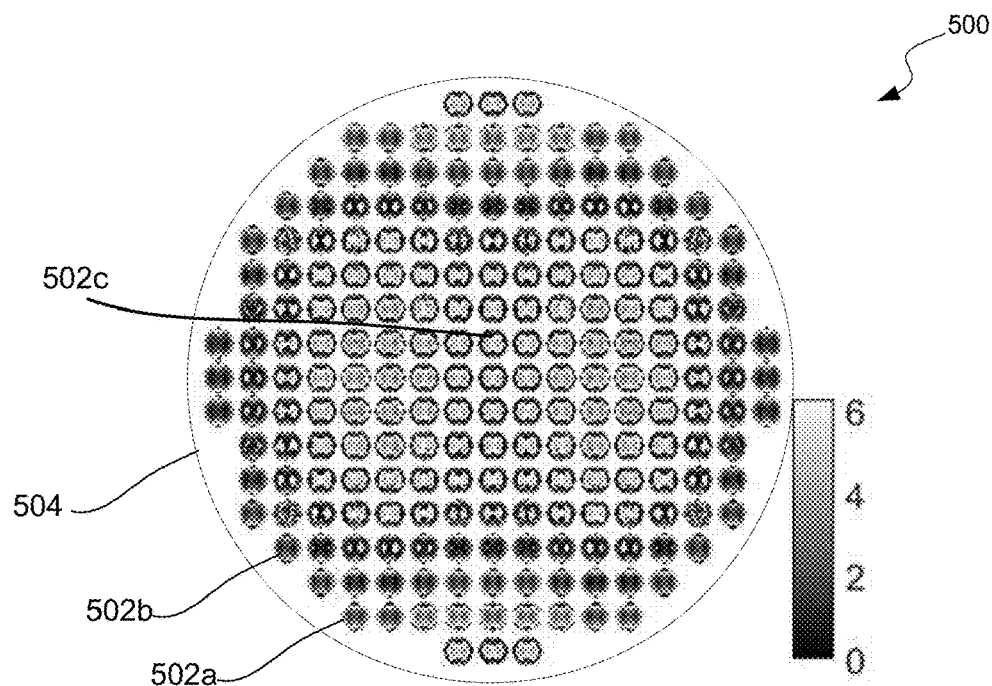
FIGS. 5A and 5B show simulated pupil phase maps that correspond to the representative stacks of FIGS. 4A and 4B, respectively, in accordance with a specific implementation of the present invention.
Figure 5B:
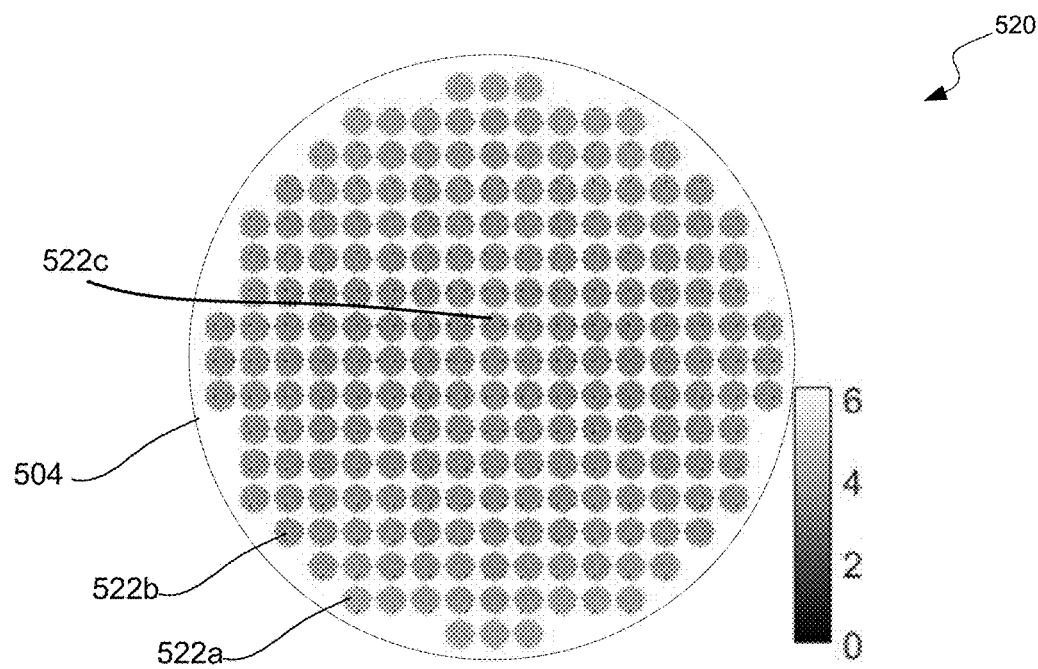

FIGS. 5A and 5B show a plurality of simulated pupil phase maps that correspond to the representative multilayer stack and partial stack of FIGS. 4A and 4B, respectively, in accordance with a specific implementation of the present invention. FIGS. 5A and 5B include phase maps for horizontal polarization for both illumination and collection waves. Additional phase maps may be simulated for other combinations of polarizations. The different shades of gray in each phase map correspond to different phase values, between 0 (black) and a (white). These shadings are reversed in FIGS. 6A-C.

In certain embodiments of the present invention, simulated exit phase maps for all illumination directions within the optical system's numerical aperture (NA) may be displayed and represented together for each stack configuration (and a particular combination of polarization settings or other settings). For example, FIG. 5A shows a set of simulated phase values in the form of a plurality of phase maps (e.g., 502a-502c) that were each obtained and displayed for a specific illumination wave angle, and each phase map is positioned at a corresponding position of the illumination pupil 504. That is, each phase map (e.g., 502a, 502b, or 502c) is displayed at an illumination pupil position that corresponds to the particular incident angle upon which the phase map is simulated. For instance, each of the pupil maps 502a and 502b is displayed at an illumination pupil position that is towards the outer edge of the illumination pupil 504 and, accordingly, corresponds to simulation results for a more oblique incident angle. In contrast, pupil map 502c is displayed at an illumination pupil position that is more in the center portion of the illumination pupil and, accordingly, corresponds to simulation results for a less oblique incident angle. Similarly, FIG. 5B shows a plurality of simulated pupil maps (e.g., 522a and 522b) for the uncovered structure of FIG. 4B and that are also displayed for a plurality of incident angles with respect to the illumination pupil 504.

In sum, each simulated phase map may correspond to a particular incident plane wave direction and all propagating scattered plane waves, and each simulated pupil map includes phase values for a plurality of exit pupil positions. In effect, scattered plane waves (e.g., 205) are simulated for each illumination angle (e.g., 204a), and the amplitude and phase of each of these scattered waves correspond to an amplitude and phase in one position ($k_x$, $k_y$) of the collection pupil (e.g., exit pupil position 208).

As noted above, the filter design may be based on the results of electromagnetic simulation, such as Rigorous Couple Wave Analysis (RCWA), of the wave scattered from a defect inside a 3D stack geometry. From RCWA, a scattering matrix $S(k_i, k_s, \alpha, \beta)$ may be computed based on models with and without the stack above the defect being present. Wave vectors $k_i$ and $k_s$ correspond to components of incident and scattered plane waves in the wafer plane, respectively; and $\alpha$ and $\beta$ correspond to input and output polarization states. The exit wave phases may then be defined, with and without the stack above the defect, as $\varphi_n(k_i, k_s, \alpha, \beta)$ and $\varphi_s(k_i, k_s, \alpha, \beta)$, respectively. The subscript n corresponds to exit phase for the bare defect without the stack being present, and the subscript s corresponds to exit phase for the defect being buried under the stack. The exit phase values for either the stack being present or absent may be derived based on the computed scattering matrix and the illumination electric field $E_{in}$ in the wafer plane for incident wave $k_i$ and polarization a by:

$$\varphi(k_i, k_s, \alpha, \beta) = \arg[S(k_1, k_s, \alpha, \beta) E_{in}(k_i, \alpha)] \quad \text{Equation [1]}$$

The phase difference between phase values for the stack being absent and present can then be defined as:

$$\Delta\varphi(k_i, k_s, \alpha, \beta) = \varphi_n(k_i, k_s, \alpha, \beta) - \varphi_s(k_i, k_s, \alpha, \beta) \quad \text{Equation [2]}$$

For instance, the difference between the phase map 502a and 522a, between phase map 502b and 522b, and between 502c and 522c may be determined. Final phase map values P can then be obtained by averaging over illumination directions ($k_1$) and polarizations ($\alpha$, $\beta$).

$$P(k_s) = \arg\{\Sigma_{\alpha,\beta} \Sigma_{k_i} \exp(i\Delta\varphi(k_i, k_s, \alpha, \beta))\} \quad \text{Equation [3]}$$

For instance, the difference phase maps for the different illumination angles and polarization pairs may then be averaged together to form a final phase map having a plurality of final phase values for the exit pupil.

Figure 6C:
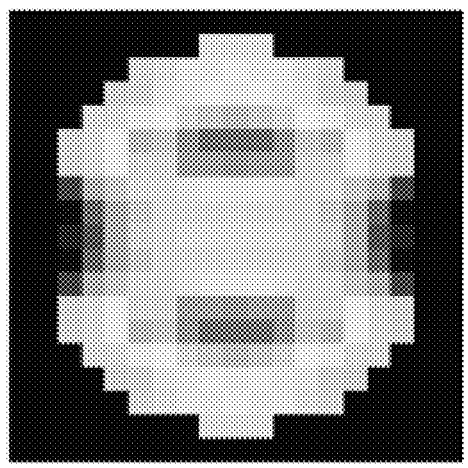
FIG. 6C illustrates a compound filter resulting from a combination of the derived phase filter of FIG. 6A and the focus shifting filter of FIG. 6B in accordance with one embodiment of the present invention.
Figure 6B:
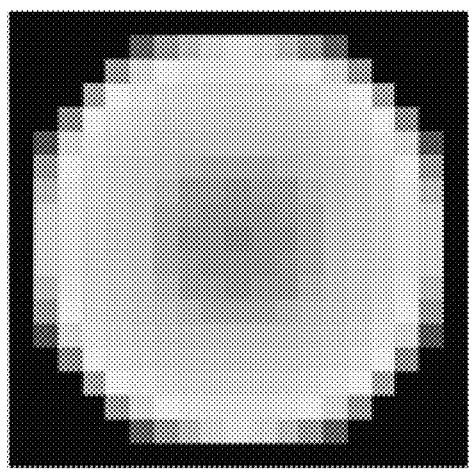
FIG. 6B illustrates a focus shifting filter for combining with the derived phase filter of FIG. 6A in accordance with an alternative embodiment of the present invention.
Figure 6A:
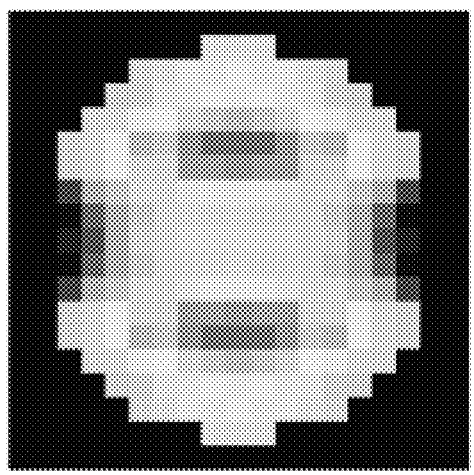
FIG. 6A illustrates a derived phase filter for a dark field illumination/collection mode and the structures of FIGS. 4A and 4B in accordance with a specific implementation of the present invention.

A phase filter may generally be computed for any number and type of entrance/exit aperture configurations, including apertures with varying attenuation. That is, a phase filter may be based on simulated phase values that are averaged across incident angles that are not blocked by the illumination/collection aperture. For example, a phase filter may be designed for darkfield mode, bright field mode, etc. However, a single phase filter may be designed based on simulation of all positions in the exit pupil, even though such filter may be used in a mode that blocks a portion of such exit pupil. FIG. 6A illustrates a phase filter that can be used for a dark field mode and the structures of FIGS. 4A and 4B in accordance with a specific implementation of the present invention.

The above described techniques for determining a phase filter may result in large phase value variations, such as seen in the phase filter results of FIG. 6A. In general, a large range of phase variation may translate into a large variation of the filter plate profile height in particular phase filter designs. To mitigate phase filter height variations, the derived phase filter may be combined with a focus shifting filter, an example of which is shown in FIG. 6B for a specific focus shift of 0.6 μm. The focus offset phase filter may generally be defined as the phase accumulated during field propagation in vacuum by a particular focus offset. FIG. 6C illustrates a compound filter resulting from a combination of the derived phase filter of FIG. 6A and the focus shifting filter of FIG. 6B in accordance with one embodiment of the present invention. In a specific example, the derived phase map is summed with the focus shifting map. The resulting compound filter has a phase and profile variation reduced by a factor of two as compared to the original derived filter, which allows reduction of the filter profile height and, accordingly, simplifies filter fabrication.

Figure 7:
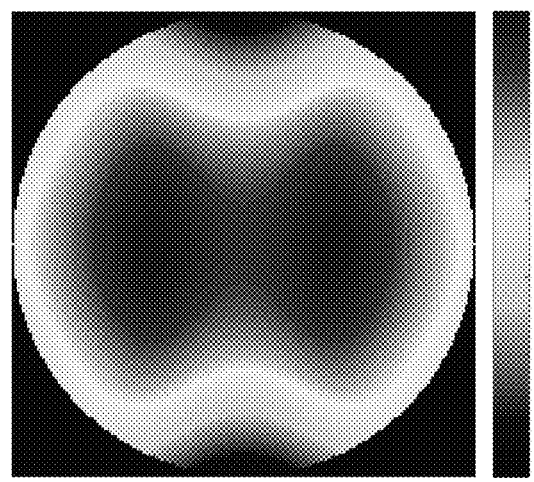
FIG. 7 illustrates a phase filter that results from the simulation phase results being interpolated and smoothed by a regularization process on a finer grid, as compared to the coarser rectangular grid that typically corresponds to simulation domain size and wavelength, in accordance with a further embodiment of the present invention.

The final filter design may also be obtained by interpolation of the phase on a finer grid than used during the simulation, using regularization to result in a smoother filter profile. FIG. 7 illustrates a phase filter that results from the simulation phase results being interpolated and smoothed by a regularization process on a finer grid, as compared to the coarser rectangular grid that typically corresponds to simulation domain size and wavelength, in accordance with a further embodiment of the present invention. For example, the finer grid may be 20-50 μm, while the coarser grid is about 400 μm or more. Any suitable regularization term may be used to obtain smoother phase filter results. Minimization of phase second derivatives in both directions was implemented in one case.

Figure 8:
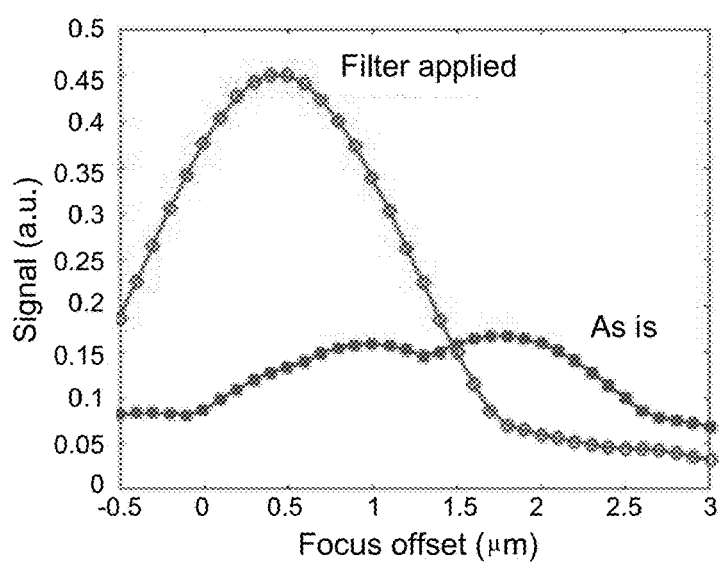
FIG. 8 shows graphs of depth signal profiles with and without the phase filter inserted in the pupil plane.

FIG. 8 shows graphs of depth signal profiles with and without the phase filter inserted in the pupil plane. These graphs demonstrate a three-fold signal increase when the phase filter is applied. That is, the depth signal profiles correspond to the defect through focus difference image with ("filter applied") and without ("as is") phase filter. Using such a specifically designed phase filter can help significantly improve speed and provides a way to quickly check phase filter efficiency for different wavelengths, polarizations, and apertures.

A suboptimal result may be produced if a high number of parameters are involved or the signal from the bare (or uncovered) defect is not compact. An alternative optimization technique can be applied to determine a phase filter design. In one optimization example, a simulated phase filter may be applied to the computed field for all illumination directions for both a stack structure with and without a defect to obtain images with and without a defect, respectively. A target image $I_{tar}$ for a stack structure with a defect and a reference image $I_{ref}$ for the same stack without a defect may then be computed in real space by calculation of wave propagation to the image plane and summation of the field intensities in this plane over all coherent, but mutually incoherent, modes (polarizations and incident directions). The difference image can then be determined and optimized to design a phase filter.

Figure 3B:
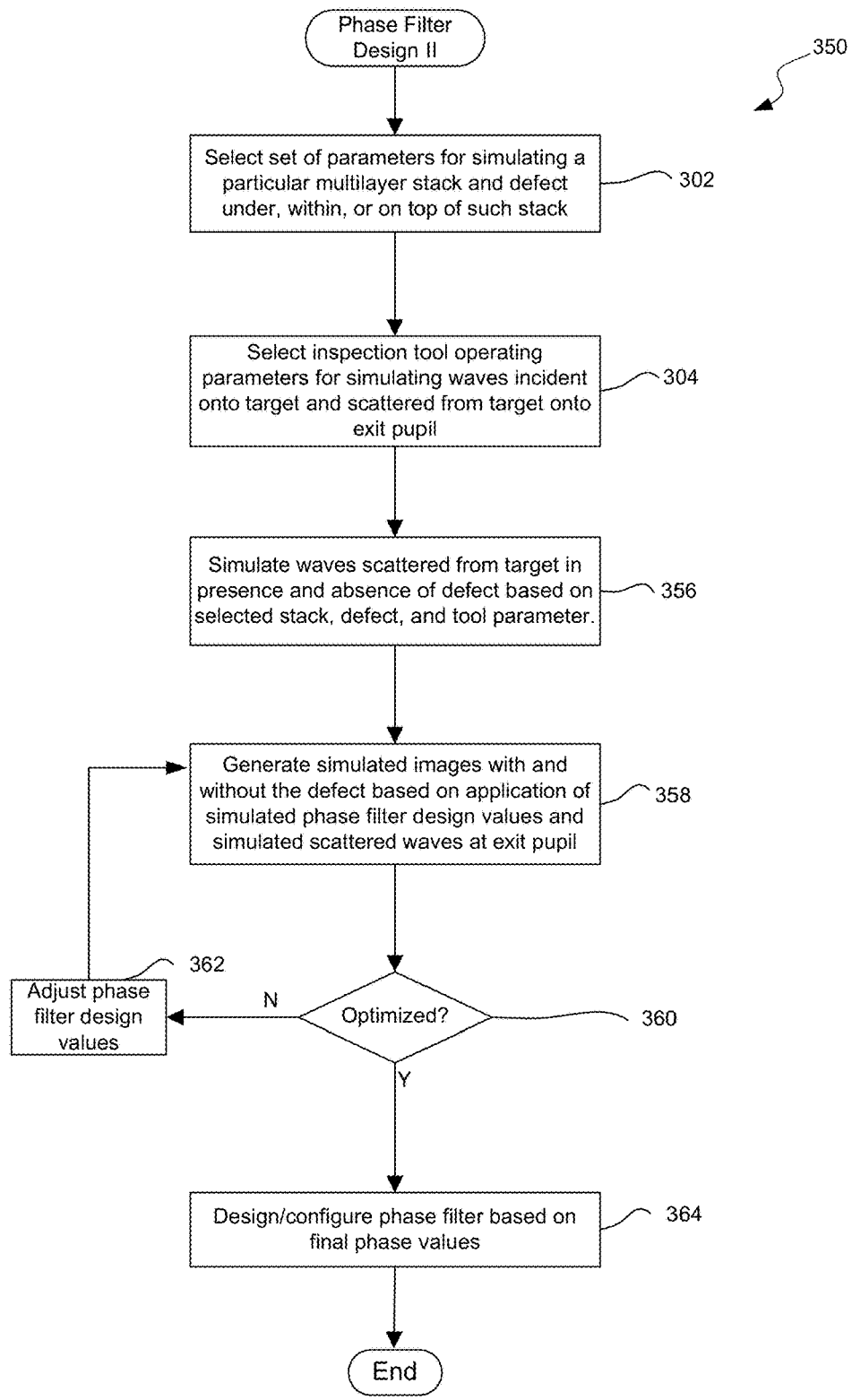
FIG. 3B is a flow chart illustrating an optimization process for designing a phase filter in accordance with a second embodiment of the present invention.

FIG. 3B is a flow chart illustrating an optimization process 350 for designing a phase filter in accordance with a second embodiment of the present invention. In one example, this technique utilizes a difference image. Similar to the first method, a first set of parameters for simulating a particular multilayer stack and defect under or within such stack may be initially provided in operation 302. That is, modelled structure parameters for the stack and defect may be selected for input into the simulation process. The inspection tool operating parameters (e.g., polarization, etc.) may also be selected in operation 304.

Waves scattered from the target in the presence and absence of a defect may then be simulated based on the selected stack, defect, and tool parameters in operation 356. For instance, RCWA may be used to compute the scattered wave response at the exit pupil for the incident waves on the modelled structure with and without a defect. In an alternative embodiment, the response is only simulated for a modelled stack having a defect (and not for a defect-free stack).

Simulated images for the target with the defect ($I_{tar}$) and without the defect ($I_{ref}$) may then be generated based on the application of initial simulated phase filter values on the simulated scattered waves at the exit pupil in operation 358. In a specific implementation, image intensity may generally be defined by:

$$I(r) = \Sigma_{k_i} \Sigma_{\alpha,\beta} |F[\exp(ik_z f)\exp(iP(k_s))S(k_i,k_s,\alpha,\beta)E_{in}(k_i,\alpha)]|^2 \qquad \text{Eq. [4]}$$

where $E_{in}$ is the illumination electric field in the wafer plane; f is focus offset; $k_z$ represents the scattered plane wave component perpendicular to the wafer plane; and F is the Fourier transform function. In this example, $P(k_s)$ is the filter phase as simulated to be common for all illumination directions and polarization settings. In alternative embodiments, this process may be applied to a subset of illumination angles and/or polarization settings.

An iterative optimization process may then be implemented to determine whether an optimized phase filter has been found in operation 360. If optimization has not occurred yet, the phase values may be adjusted in operation 362, and new simulated images are obtained based on such adjusted phase values in operation 358. After the phase values have been determined to be optimized, a phase filter may be designed or configured based on the optimized final phase values in operation 364, and used for defect inspection on an actual target.

In the illustrated example, the optimization process may include finding the set of phase values that result in optimization of the difference image (e.g., $I_{tar}-I_{ref}$). The difference image may be generated by taking the difference between an image of the stack structure with a defect and an image generated from the ideal stack structure without a defect. The difference image may then be used to solve an optimization problem for the optimized phase filter $P_o$:

$$P_o(k_s) = \underset{P(k_s)}{\text{argmin}} \{-(I_{tar}(r) - I_{ref}(r)) + \lambda E_s\} \qquad \text{Equation [5]}$$

where the first term $[-(I_{tar}-I_{ref})]$ in the optimized expression of Equation [5] is the data penalty term and r represents the defect position within the image. In the illustrated example of FIG. 3B, the data penalty term is the difference image I between an image with and without a defect in a given inspection plane. This defect difference term has a minus sign so as to maximize the difference defect signal. This data penalty term could alternatively be based on a measurement of the deviation from the desired system response in three dimensions, constrained by the wave propagation equation. That is, the phase filter design may be optimized to result in a simulated scattered wave response for a particular defect within a particular stack structure that has maximum signal strength and spread function. The first term can also maximize the difference between signals from a defect of interest and nuisance defect to eliminate nuisance defects from detection. In either case, the $E_s$ parameter of Equation [5] may correspond to a smoothness penalty so as to minimize sharp changes in the resulting signal. For instance, $E_s$ can be set as the 2-norm of phase filter second derivatives. The regularization parameter $\lambda$, determines the relative weight of the smoothness penalty. In one example, $\lambda$, is fixed, e.g., $10^{-3}$.

In general, the function in Equation [5] can be minimized by any of suitable type of optimization techniques, such as gradient descent or quasi-Newton techniques. In a specific implementation, the best result out of several optimization runs, with random starts, may be selected. This optimization process allows omission of the intermediate step of generating a low-resolution phase map as in the technique described above, and directly optimizes a high-resolution phase filter design. This alternative optimization technique also allows quick defect image optimization for multivariate problems which includes broadband illumination, SNR (signal to noise ratio) maximization, DOI (defect of interest) image enhancement with simultaneous nuisance suppression, optimization with respect to both phase and aperture shapes, etc.

Any of the techniques for designing a particular phase filter described herein may be performed with respect to different inspection tool configurations, different inspection operating parameters, different defect types, defect positions within a multilayer stack, different stack materials and configurations, etc. Additionally, any suitable phase filter can be designed based on the phase simulation results for a particular inspection tool and wafer process, and different phase filters may be constructed and used for different inspection tools and wafer processes.

In one example, a fixed or static phase filter can be constructed from any suitable rigid structure, such as a glass plate having thickness variations to achieve the desired phase shift patterns. The phase filter is fabricated by coating a glass plate with a photoresist and modulating its height via a photolithography processing. Subsequently, this profile may be translated into glass by an etching process, such as reactive ion etching, by way of example. Phase shift translates into the glass height h as:

$$h(k) = P(k)\lambda/2\pi[n(\lambda)-1] \qquad \text{Equation [6]}$$

where $\lambda$ is incident light wavelength, and n is the glass refractive index. Assuming n=1.5, a full cycle phase shift corresponds to a glass height of 1.6 μm for an 800 nm wavelength. This type of construction allows the absence of light intensity loss and the utilization of unpolarized light, thus maximizing the scattered intensity.

In an alternative embodiment, an adjustable phase/amplitude spatial light modulator may be configured based on the phase filter design. An adjustable phase filter can be optimized in real time in defect review mode by monitoring image intensity response to changes in phase shifts applied in the collection pupil and using an electronic feedback system for filter adjustment. Thereafter, a resulting phase filter can be transferred to a permanent design. Alternatively, use of a liquid crystal on silicon spatial light modulator in reflection geometry can be used as a flexible phase filter design, though at the expense of image intensity and a limit on the power of incident light. Another embodiment pertains to determining the optimal phase filter by optimizing the spatial light modulator using an optimization method. In this case, measured images, instead of simulated images, are used in Equation [5]. Application of a transmission phase/amplitude spatial light modulator is also possible.

Figure 9A:
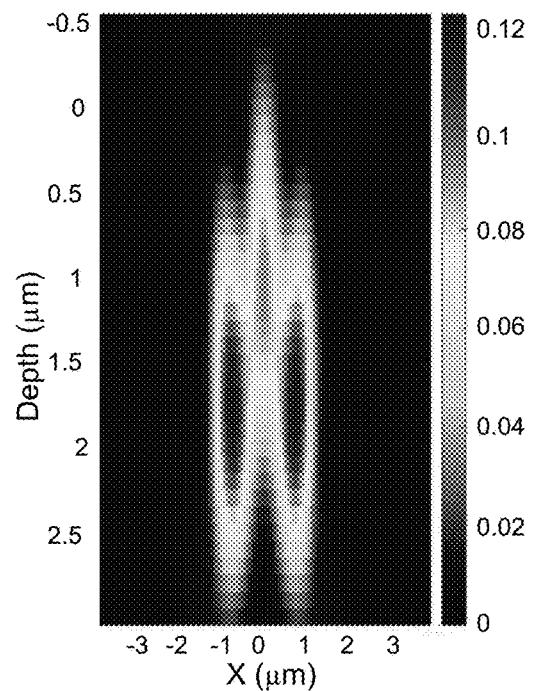
FIGS. 9A and 9B show the expected change in the through focus image of a defect without a filter and with application of an optimized phase filter in accordance with one embodiment of the present invention.
Figure 9B:
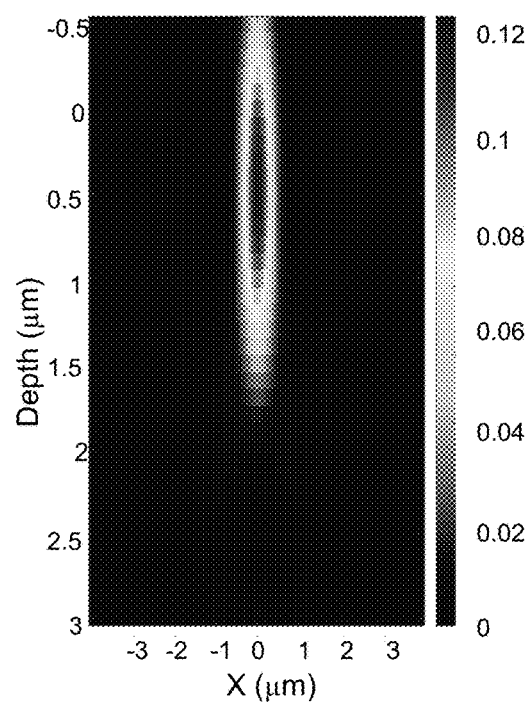

Certain embodiments of the present invention provide a phase filter that enhances and improves the defect signal. FIGS. 9A and 9B show the expected change in the through focus image of a defect by the optimized phase filter as compared to without a filter. Due to interference with the wave scattered by the patterned stack, the difference image without a phase filter has a complicated shape with two bright and one weaker lobes, shown in cross-section in FIG. 9A. With the exit field modified by the phase filter, these lobes are merged into a single lobe with intensity increased by a factor of 3 as shown in FIG. 9B. This image simplification will be expected to improve signal detection and interpretation.

Use of a carefully designed phase filter increases optical signal from buried defects in 3D NAND wafers and the like [see FIG. 8] and allows easier identification and classification of defects. Additionally, the need for image post-processing to recombine the defect signal from multi-plane inspections to enhance the signal-of-interest may be eliminated, and certain techniques described herein directly maximize the defect signal before imaging or defect detection. In a specific application, sensitivity of optical inspection to buried defects in 3D NAND structures is expected to improve.

A phase filter that is designed as described herein may be used in any suitable type of defect inspection system, such as a system for imaging wafers or focusing a spot onto a defect in the presence of a stack structure that complicates the defect signal so that it is difficult to detect and/or classify such defect. In general, a phase filter may be added to any system in which complicated detected signals are obtained from non-defective structures and cause defect signals to get spread out, and such phase filter serves to simplify and contain the spread of such defect signals caused by the non-defective complex structures.

Certain embodiments of the present invention include use of a phase filter in a microscopy system or module to detect defects at various depths in a multiple layer semiconductor stack, such as a 3D NAND structure. For example, any suitable system may be configured for inspecting 3D stacks. The system may be configured to operate at long wavelength ranges, such as visible to near infrared (NIR) or about 700 nm to about 950 nm to image ONON stacks. In another embodiment the system is configured to operate at shorter wavelengths above 190 nm for other wafer types. In other embodiments, an inspection system for inspecting wafers or the like in other inspection modes can include a confocal module for detecting and/or reviewing defects in 3D stacks.

In general, an inspection tool may include at least one light source for generating an illumination light beam to detect defects at various depths of a vertical semiconductor stack, an illumination optics module for directing the illumination beam to the stack, a collection optics module for directing in output light that is scattered from the stack in response to the illumination beam, via a phase filter, towards a detector or sensor for detecting the scattered light and generating an image or signal, and a controller for controlling the components of the inspection/review tool and facilitating defect detection and/or review based on images generating for various depths in the stack as described further herein.

Figure 10:
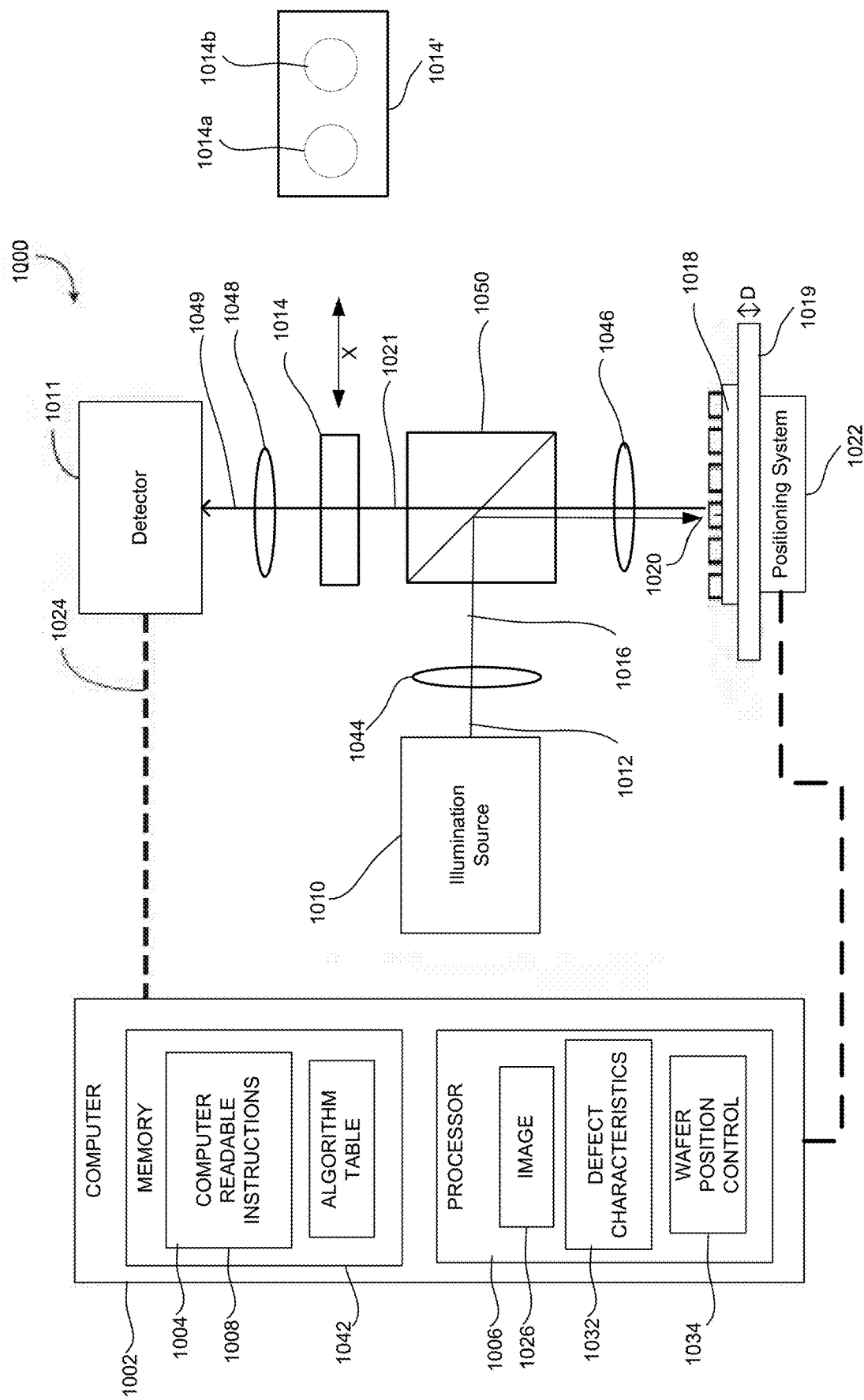
FIG. 10 is a schematic block diagram of an apparatus for inspecting a semi-conductor wafer using a phase filter in accordance with one embodiment of the present invention.

FIG. 10 is a schematic block diagram of an apparatus 1000 for inspecting a semi-conductor wafer using a phase filter in accordance with one embodiment of the present invention. System 1000 includes light, or illumination, source 1010 and detector 1011. Light source 1010 is arranged to illuminate wafer 1018 with light (e.g., an electromagnetic waveform) 1012 in a vacuum (VUV), deep (DUV), middle (MUV) and near ultraviolet (NUV), visible, IR, and/or NIR wavelength range. For instance, the light source outputs illumination light at a range between about 300 nm and 450 nm so as to penetrate a thick 3D stack. Examples of light sources include a laser-driven light source, a high-power broadband plasma light source, a transillumination light source (e.g., halogen or Xe lamp), a filtered lamp, LED light sources, etc. Multiple LED or speckle buster laser diodes are also possible sources.

The system includes illumination optics to direct the illumination light generated by light source 1010 towards the sample 1018. For example, the illumination from the light source may also pass through a number of optical components, including lenses, filters or apertures, which serve to relay (e.g., shape, focus or adjust focus offset, filter/select wavelengths, filter/select polarization states, resize, magnify, reduce distortion, etc.) the beam towards the sample 1018. For instance, illumination light may be directed and focused by lens system 1044 onto a beam splitter 1050, such as a dielectric mirror, which reflects the illumination light towards the sample 1018 via optical lens system 1046, which is configured to focus the illumination light onto a focus point (spot or area) 1020 of the sample 1018 that is positioned at a particular depth within the stack.

Sample 1018 has thickness D in a z direction, orthogonal to x and y directions, and inspection area 1020. Light beam 1016 illuminates area 1020. The sample can be in the form of a wafer and can be made of any material known in the art. In one example, wafer 1018, or at least inspection area 1020, is silicone dioxide on a silicon base. It should be understood that FIG. 10 is not to scale and is for purposes of illustration only.

The system 1000 also includes a phase filter 1014 that is arranged to filter light 1021 scattered by or reflected from wafer 1018, to generate light beam 1049, having altered phase values as described herein. For instance, phase filter 1014 may take the form of a fixed phase filter having various heights for adjusting the phase at different positions in the collection pupil or an adjustable filter. In another example, multiple phase filters having different phase characteristics (e.g., for different wafers) may be provided in a movable phase filter structure. As shown, movable phase structure 1014' may be positioned in the collection path at different X positions to move either phase filter 1014a or 1014b into the collection pupil. Of course, the phase filter structure may include more than two phase filters, which may be arranged in any suitable pattern. For instance, multiple phase filters may be arranged in both an X and Y direction, and different phase filters may be selected by moving the phase filter so that a particular XY position and phase filter is placed in the collection path. In another example, the phase filters may be arranged in a circular pattern, and a particular phase filter may be rotated into the collection path.

In an example embodiment, apparatus 1000 includes any suitable collection of optical components for shaping, directing, attenuating, and focusing the scattered light towards a detector. As shown, the system includes lens system 1046 for directing the scattered light from specimen 1018, which is then directed through beam splitter 1050, phase filter 1014, and lens system 1048 onto detector 1011. In one specific example, the collection optics may include an output aperture module (e.g., 1048) that is positioned and dimensioned so as to pass focused light and block unfocused light. In this embodiment, the focused light can reach the detector, while the unfocused light is largely blocked from reaching the detector.

The detector 1011 is arranged to receive and detect beam 1049. Detector 1011 generates and transmits signal 1024 characterizing detected beam 1049. Any suitable detector type or number of detection elements may be used to receive the output light from one or more focus spots and provide an image or a signal based on the characteristics (e.g., intensity) of the received output light. By way of example, detector 1011 may be in the form of a CCD (charge coupled device) or TDI (time delay integration) detector, photomultiplier tube (PMT), or other sensor (or sensor array). In one embodiment, the detector may include an array of isolated point detectors that sense radiation in an area that is also approximately the size of or smaller than the diffraction limit of the radiation to efficiently sense the focused radiation while minimizing detection of unfocused light.

The illumination and collection optical elements of the system may be reflective or transmissive. The output beam may be reflected or scattered from the sample or transmitted through the sample.

In general, each optical element of the system (illumination and collection) may be optimized for the optimal wavelength range of the light for detecting defects at various depths in multilayer stack. Optimization may include minimizing wavelength-dependent aberrations, for example, by selection of glass type, arrangement, shapes, and coatings (e.g., anti-reflective coatings, highly reflective coatings) for minimizing aberrations for the corresponding wavelength range. For example, the lenses are arranged to minimize the effects caused by dispersion by longer wavelength ranges (visible~NIR).

The beam splitter 1050 may be coated or formed with any suitable material for reflecting and passing longer wavelengths for penetrating 3D stack structures. Example materials for working with light in the NIR range include most common optical glass materials such as BK7 or Fused Silica, etc. The objective lens (e.g., 1046) may also be optimized for all of the wavelengths that are used for defect detection. For instance, the objective has a composition, including lens coatings, and arrangement for correction of color aberration. In an alternative embodiment, the objective lens may be an all reflective objective or refractive or a combination (catadioptric) configuration.

Certain embodiments of the present invention provide an inspection system that generates at least one light path at DUV~visible or visible~NIR wavelengths. The system may also include components for optional polarized light in each illumination and collection path, optional spectral sub-band filters, and optional aperture shapes in the illumination and collection paths for the inspection of multilayer wafer structures.

The illumination path and collection path may include an aperture, each being described as a single aperture for ease of discussion. However, each aperture module may be a single pinhole/slit, pinhole array, slit array, etc. Example aperture modules include a fixed pinhole/slit array, a rotating Nipkow disk, a programmable spatial light modulator (SLM), etc. Each aperture or slit may be formed from a hole/slit-shaped material that is transparent to longer wavelengths or a hole/slit opening in an opaque mask material. Multi-hole/slit aperture modules can be used to simultaneously direct multiple spots towards the sample and detect multiple spot images of different areas and/or depths of the sample. The detector would also preferably include sensors that are each sized to detect light in an area that is less than or equal to the pinhole area. The apertures may also be used to form various shapes for the beam in the illuminations/collection pupils.

The apparatus 1000 can also be configured to place, in the z direction, each wafer 1018 to be inspected at a particular focus position. Apparatus 1000 may include wafer positioning mechanism 1022 that can be configured to move the wafer in any suitable manner, including x, y, and z directions. In an example embodiment, computer 1002 includes a wafer position control system 1034. For instance, the positioning mechanism 1022 may be coupled to the stage 1019 for moving the sample so that the focus spot(s) penetrate to different depths of the sample stack. Different depths for each simultaneously generated focus spot may also be achieved by tilting an aperture array (and corresponding output aperture array) relative to the sample or tilting the sample relative to the aperture modules. Alternatively or additionally, the optics may be moved by a positioning mechanism so as to move the focus spots relative to the sample.

One or more positioning mechanisms may also be configured to move other components of the inspection system, such as the aperture modules, illumination or collection mirrors, wavelength filters, polarizers, etc. By way of specific examples, one or more motor mechanisms may each be formed from a screw drive and stepper motor, linear drive with feedback position, or band actuator and stepper motor.

The system may also include a tunable or selectable spectral filter that is configurable to increase sensitivity for particular materials and stack types. A spectral filter may be used to further dynamically define the spectrum of the illumination beam. One or more spectral sub-band filters may be placed in an illumination pupil of the illumination beam to achieve different sub-band wavelength ranges. However, the system may include any number and type of lenses for forming an illumination pupil at which a spectral sub-band filter may be positioned. Generally, each inspection wavelength range may be selected based on optimization of its sub-band, illumination and collection pupil aperture shapes, polarization of the illumination and collection path, magnification, pixel size, or any combination thereof.

For inspection of multilayer structures, different wavelength band pass ranges may be selected between about 190 nm and 950 nm to optimize the inspection sensitivity for the buried 3D defect types and/or material of the 3D structures. For instance, two long wavelength ranges may take the form of two narrow sub-bands that each has a width that is equal to or less than 50 nm. Along with a longer wavelength range, a shorter wavelength range, such as less than 400 nm, may also be used to inspect surface defects in addition to buried defects. In one embodiment, any suitable number of wavelength ranges may be selected between a deep ultraviolet (DUV) or UV range through a NIR range.

A polarization setting may also be applied to each wavelength range (or sub-band). For instance, a horizontal polarization may be selected for the selected wavelength sub-band. A polarization setting (via a polarization optics module) may be applied based on any suitable inspection parameter, such as defect type, sample geometry and composition, wavelength range or sub-band selection, etc.

The system also includes one or more controller or computer system modules, for controlling various components of the system and receiving and analyzing detected signals or images from the detector 1011. For instance, the controller may control selective activation of the illumination source, the illumination or output aperture settings, phase filter selection, wavelength band, focus offset setting, polarization settings, etc. As shown, system 1000 includes computer/controller 1002 having memory element 1004 and processor 1006. Memory element 1004 is configured to store computer executable instructions 1008.

Additionally, the signals captured by the detector can be processed by controller 1002, which may include a signal processing device having an analog-to-digital converter configured to convert analog signals from each sensor into digital signals for processing. The controller 1002 may be configured to execute the computer readable instructions 1008 to analyze intensity (e.g., image 1026), and/or other characteristics of the sensed light beam to determine various defect characteristics 1032, such as defect type, size, depth, or shape. In an example embodiment, the processor uses an algorithm or a look-up table 1042, stored in memory 1004, to determine defect characteristics 1032.

Any of the above described systems may include a controller configured (e.g., with programming instructions) to provide a user interface (e.g., on a computer screen) for displaying phase maps, phase designs, resultant test images and other inspection characteristics as described further herein. The controller may also be configured to receive the image or signal generated by each detector and analyze the resulting image or signal to determine whether defects are present on the sample, characterize defects present on the sample, or otherwise characterize the sample.

The controller may be any suitable combination of software and hardware. For example, the controller may include a processor, coupled to input/output ports, and one or more memories via appropriate buses or other communication mechanisms. The processor and memory may be programmed to implement instructions of the method embodiments of the present invention. The controller may also include one or more input devices (e.g., a keyboard, mouse, joystick) for providing user input, such as changing focus depths, phase values, viewing detection results data or images, setting up an inspection tool recipe.

Because such information and program instructions may be implemented on a specially configured computer system, such a system includes program instructions/computer code for performing various operations described herein that can be stored on a computer readable media. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

It should be noted that the above description and drawings of an inspection system are not to be construed as a limitation on the specific components of the system and that the system may be embodied in many other forms. For example, it is contemplated that the inspection or measurement tool may have any suitable features from any number of known imaging or metrology tools arranged for detecting defects and/or resolving the critical aspects of features of a reticle or wafer. By way of example, an inspection or measurement tool may be adapted for bright field imaging microscopy, darkfield imaging microscopy, full sky imaging microscopy, phase contrast microscopy, polarization contrast microscopy, and coherence probe microscopy. It is also contemplated that single and multiple image methods may be used in order to capture images of the target. These methods include, for example, single grab, double grab, single grab coherence probe microscopy (CPM) and double grab CPM methods. Non-imaging optical methods, such as scatterometry, may also be contemplated as forming part of the inspection or metrology apparatus.

This or any other system may be used to find or review detected defects that are embedded in a 3D stack, such as 3D NAND and other 3D memory structures. Other types of stack structures that may be inspected or imaged using the inspection apparatus of the present invention include solar panel structures, optical disks, etc.

Figure 11:
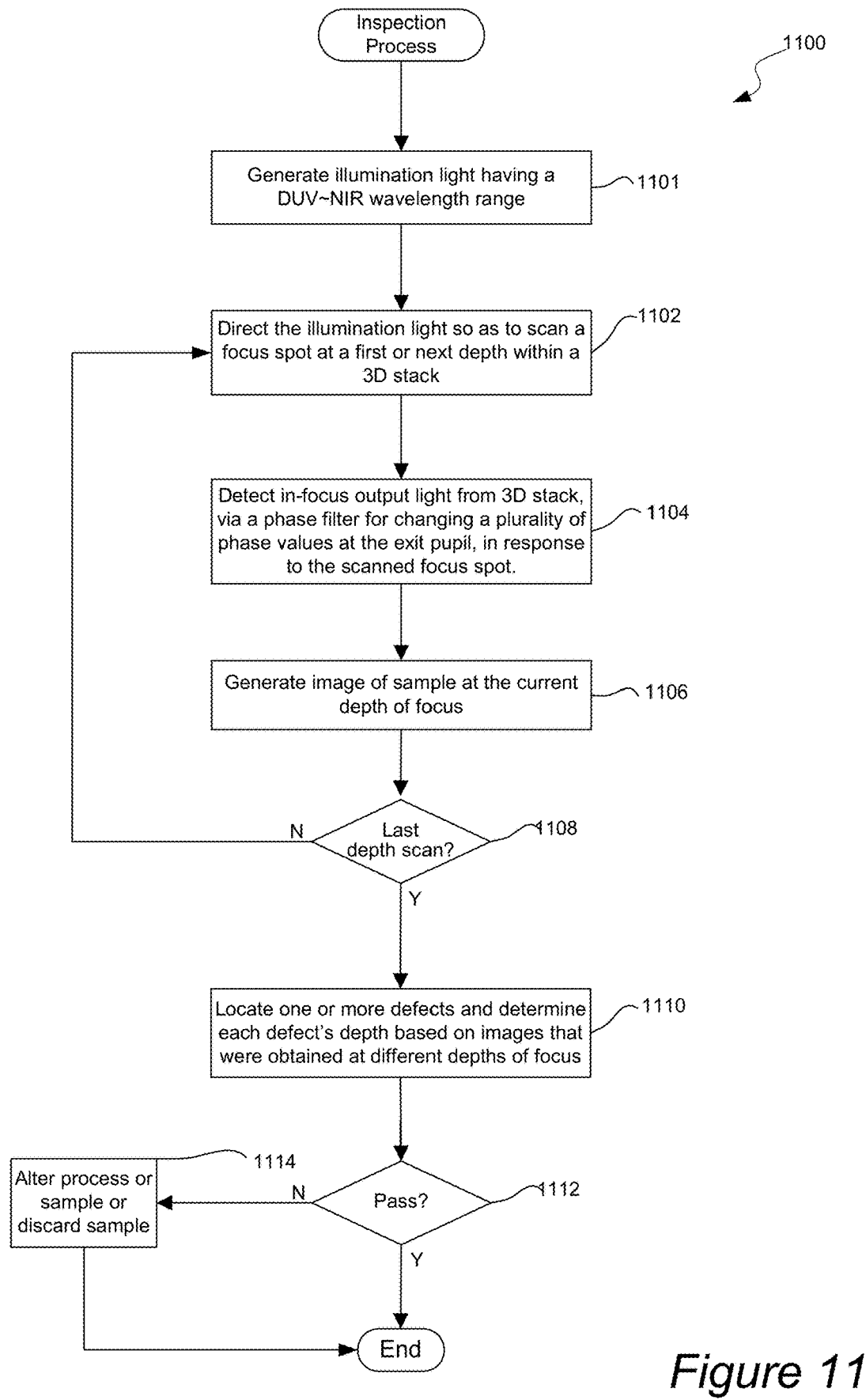
FIG. 11 is a flow chart illustrating an inspection process in accordance with one embodiment of the present invention.

With the inspection being configured with a phase filter, a wafer can then be inspected for locating defects in a multilayer stack using any suitable inspection technique for stack defect. FIG. 11 is a flow chart illustrating an inspection process 1100 in accordance with one embodiment of the present invention. Initially, illumination light having a wavelength range between DUV and NIR may be generated in operation 1101. The illumination light may then be directed so as to scan a focus spot at a first depth within a 3D stack in operation 1102. For example, a focus spot is scanned across a portion of the sample at a particular depth of focus.

The in-focus output light reflected or scattered from the 3D stack in response to the scanned focus spot may then be detected via a phase filter for changing a plurality of phase values at the exit pupil in operation 1104. The beam may be focused at the expected depth of the defect from the simulation, or at a depth having a defect maximum signal from a through-focus review of selected defects. In general, the phase filter is designed or configured in accordance with any of the phase filter design techniques described herein.

It may then be determined whether this is the last depth that is to be scanned in operation 1108. For instance, the depth of the 3D stack that is to be scanned is known and the depth of focus can be incremented from a top surface of the 3D stack to a bottom of the 3D stack. When the bottom is reached, the scans are complete. Additionally, additional 3D stack structures can each be scanned at multiple depths of focus, and when the depths of each of the 3D stack structures have been incrementally scanned, the scans are complete. If the scans are not complete, one or more focus spot(s) at a next depth of focus may be scanned and detected and used to generate corresponding detection images at the various depths by repeating operations 1102, 1104, and 1106.

If scans at all the desired depths are complete, one or more defects may be located and each defect's depth may be determined based on the images that were obtained at the different depths of focus in operation 1110. In one embodiment, any suitable inspection analysis process may be performed to first find defects. For instance, a cell-to-cell, die-to-die, or die-to-database comparison can be made between each test and reference image. For example, defects may be detected for an imaged area at a particular depth that differs from another reference image area at the same depth, which is obtained from another die, cell, or simulated from a design database.

If a defect is found, the depth of the defect may be correlated to the image that has the sharpest contrast for such defect. For instance, the defect will tend to have a maximum brightness (or darkness) as compared to the surrounding background in the image that is generated from the depth of focus that corresponds to such defect's depth within the sample. Accordingly, the center of the depth of focus (corrected for the focus offset shift, produced by a phase filter, and effective refractive index of a stack) that was used to generate the image with the highest brightness level for the defect can be defined as the defect's depth. Additionally, the defect's depth may be correlated with known signals from a set of reference defects to determine the defect classification.

The images for a particular stack area can be scanned to find the image in which the defect has the strongest peak. The xy location in the image can be defined as the defect's pixel location. The depth for the defect can be determined by the corresponding z position of the wafer with respect to the illumination system.

Referring back to FIG. 11, it may then be determined whether the sample has passed inspection in operation 1112. It may also be determined whether the defect is repairable. If the sample does not pass, the process or sample may be altered in operation 1114. The sample may also be discarded, in addition to altering the process.

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention. For example, the defect detection characteristic data may be obtained from a transmitted, reflected, or a combination output beam. Additionally, the system can be used at other wavelength ranges, besides visible to NIR, such as a visible, ultraviolet, deep-ultraviolet, or vacuum ultraviolet wavelength range, to determine depth of defects. Accordingly, the present embodiments are to be considered as illustrative and not restrictive, and the invention is not to be limited to the details given herein.

What is claimed is:

1. A method of facilitating defect detection in a multilayer stack, comprising:
    selecting a set of structure parameters for modeling a particular multilayer stack and a particular defect contained within such particular multilayer stack and a set of operating parameters for an optical inspection system;
    based on the set of structure and operating parameters, performing an electromagnetic simulation of waves scattered from the particular multilayer stack and defect and arriving at a collection pupil of the optical inspection system;
    based on the simulated waves at the collection pupil, determining a design of a phase filter having a plurality of positions for changing a plurality of phases at a plurality of corresponding positions within the collection pupil of the optical inspection tool so as to compensate for an adverse effect of the particular multilayer stack on obtaining a defect signal for the defect within such particular multilayer stack and/or to enhance such defect signal; and
    providing the design of the phase filter for fabrication or configuration of a phase filter inserted within the optical inspection system for detection of defects in multilayer stacks with the same structure parameters as the particular multilayer stack.

2. The method of claim 1, wherein the electromagnetic simulation is performed using a Rigorous Couple Wave Analysis (RCWA) technique, a Finite Difference Time Domain (FDTD) technique, or a Finite Element Method (FEM) technique.

3. The method of claim 1, wherein
    the structure parameters include one or more of the following multilayer stack parameters for each layer: thickness, shape, patterns, refractive index, line edge roughness (LER), or relative placement with respect to other layers,
    the structure parameters include one or more of the following defect parameters: defect position with respect to the multilayer stack, defect type, defect composition, defect size, or defect shape, and
    the operating parameters include one or more of the following parameters: one or more illumination polarizations, one or more scattered waves polarizations, one or more spectral bands, one or more incident angles, one or more collection angles, one or more optical attenuation filters, one or more focus settings, or one or more light exposure settings.

4. The method of claim 1, wherein:
    performing the electromagnetic simulation of waves scattered from the particular multilayer stack and defect comprises simulating a plurality of phase values at the collection pupil, via simulation of a scattering matrix, for the particular multilayer stack being both present and absent, and
    the design of the phase filter is based on a difference between the simulated phase values for the particular multilayer stack being present and the simulated phase values for the particular multilayer stack being absent.

5. The method of claim 4, wherein simulating the phase values includes averaging simulated phase values across a plurality of different incident angles, different collection angles, and different combinations of illumination polarizations and collection polarizations.

6. The method of claim 4, wherein determining a design of the phase filter further comprises interpolating the phase values on a finer grid than the grid used for simulating such phase values.

7. The method of claim 1, wherein determining a design of the phase filter further comprises combining such design with a focus shifting filter so as to minimize large changes in phase values across such phase filter.

8. The method of claim 1, wherein:
    performing an electromagnetic simulation of waves scattered from the particular multilayer stack and defect comprises performing an optimization process for applying a simulated phase filter, which has a plurality of positions for changing phase values, at the collection pupil to simulated scattered waves in order to find an optimized simulated phase filter, and
    the design of the phase filter is based on the optimized simulated phase filter.

9. The method of claim 8, wherein the optimization process includes maximizing a difference between a simulated image, at an image plane, of the particular multilayer stack with and without the particular defect.

10. The method of claim 8, wherein the optimization process includes minimizing deviation from an optimum system response in three dimensions, constrained by a wave propagation equation.

11. The method of claim 1, wherein the particular multilayer stack is a 3D NAND, FinFET, or DRAM structure on a semiconductor wafer.

* * * * *